United States Patent [19]

Gupta

[11] Patent Number: 5,015,529

[45] Date of Patent: May 14, 1991

[54] PHENOLIC MOLDING COMPOSITIONS

[75] Inventor: Manoj K. Gupta, Southfield, Mich.

[73] Assignee: Occidental Chemical Corporation, Niagara Falls, N.Y.

[21] Appl. No.: 244,192

[22] Filed: Sep. 14, 1988

Related U.S. Application Data

[63] Continuation-in-part of Ser. No. 946,350, Dec. 24, 1986, abandoned.

[51] Int. Cl.$^5$ .................. B32B 27/38; C08K 07/14
[52] U.S. Cl. .................................. 428/414; 428/501; 428/524; 523/466
[58] Field of Search ............... 428/414, 447, 524, 702, 428/501; 523/217, 466; 525/485, 487

[56] References Cited

U.S. PATENT DOCUMENTS

| | | | |
|---|---|---|---|
| 4,075,155 | 2/1978 | Philipps | 524/594 |
| 4,116,921 | 9/1978 | Olivo et al. | 524/594 |
| 4,268,648 | 5/1981 | Freitag et al. | 525/485 |

FOREIGN PATENT DOCUMENTS

| | | | |
|---|---|---|---|
| 0951065 | 3/1964 | United Kingdom | 525/487 |
| 1363227 | 8/1974 | United Kingdom . | |

*Primary Examiner*—John C. Bleutge
*Assistant Examiner*—Robert E. L. Sellers, II
*Attorney, Agent, or Firm*—James F. Tao; James F. Mudd

[57] ABSTRACT

Phenolic molding compositions, particularly useful as sheet molding compositions comprise: (1) a resole phenolic resin, (2) a thickening agent selected from the group consisting of alkaline earth metal oxides or hydroxides and silanes, (3) a filler selected from the group consisting of clay, talc, and mixtures thereof, and (4) an epoxy resin.

4 Claims, No Drawings

PHENOLIC MOLDING COMPOSITIONS

BACKGROUND OF THE INVENTION AND INFORMATION DISCLOSURE STATEMENT

This is a continuation-in-part of application Ser. No. 946,350, filed Dec. 24, 1986 now abandoned.

This invention relates to improved phenolic molding compositions and, in particular, to sheet molding compositions based on resole phenolic resins and having improved maturation characteristics.

Thermosetting phenolic molding compositions, based on phenol formaldehyde resins in admixture with fillers, are commonly used to form molded articles which can be readily cured into hard durable molded products. A typical phenolic molding composition is described in U.S. Pat. No. 2,424,787. The patent discloses the use of both "1-stage" or resole and "2-stage" or novolak resin in the production of phenolic molding compositions. In the production of the resole resin molding compositions, the patentee discloses that it is necessary to mix the resin syrup with the filler, because of the liquid nature of the resin. It is further taught that it is preferred to incorporate an alkali metal oxide or an alkaline earth metal oxide including compounds of calcium and magnesium, in the molding composition with the phenolic resin and filler. Magnesium oxide is mentioned as particularly advantageous. The addition of the oxide to the molding composition causes the composition to harden at room temperature or at slightly elevated temperatures. However, this solidification does not convert the resin into the final infusible, insoluble stage and the solidified product may be molded under heat and pressure to form a final molded product.

U.S. Pat. No. 4,075,155 to Philipps, discloses the use of phenol formaldehyde resole molding compositions in sheet molding compound (SMC) technology which heretofore had been generally limited to the use of polyester resins. The molding compositions of Philipps include fillers, compounds such as calcium hydroxide and magnesium hydroxide, mold release agents and coupling agents.

U.S. Pat. No. 3,956,227, discloses phenolic molding compounds including cement which contains calcium oxide and further disclosed the use of silane coupling agents. Sheet molding compounds were disclosed by the patentees. Related patents include U.S. Pat. Nos. 3,944,515 and 3,988,289. A later patent, U.S. Pat. No. 4,182,701, was directed to phenolic molding compounds made by mixing the phenol and aldehyde reactants together with calcium hydroxide and a silane coupling agent. Use of calcium hydroxide and magnesium hydroxide during the reaction of the phenolic resin is also disclosed in U.S. Pat. No. 4,070,331.

Olivo et al in U.S. Pat. No. 4,116,921 disclose phenolic molding compounds made from formaldehyde and bisphenol. The patentees disclose the use of calcium oxide or hydroxide in the molding compounds. These patentees also disclose the use of hollow carbon and hollow phenolic resin microballoons.

British Patent No. 1,363,227 to Farkas discloses sheet molding compounds made from a phenol aldehyde resole resin that is modified with a glycol. The resins are cured with acids. Resins that are modified with oligomers are disclosed in U.S. Pat. No. 4,419,400.

There are several patent applications published in Japan, dealing with this technology. In an application published as Sho-56-92727, sheet molding compounds are disclosed which contain resole phenolic resins, calcium and/or magnesium hydroxides or oxides and fillers such as talc, clay and the like.

Japanese Patent Publication Sho-58-91935, discloses phenolic molding compounds which contain resole phenolic resins, a thickener, such as the oxides or hydroxides of calcium and magnesium, fillers and reinforcing materials combined with abrasive materials for use in brake shoes. Sheet molding compound technology is used in forming the brake shoes.

Japanese Publication Sho-59-170126 discloses sheet molding compounds made with resole phenolic resins, alkaline earth metal oxides or hydroxides impregnated into special configurations of continuous and discontinuous glass fibers.

Commercial sheet molding compositions, whether based on a polyester, phenol-formaldehyde, or other resin are typically formulated and mixed at a relatively low viscosity, for ease of mixing, combined with fiber reinforcement materials and formed as a sheet in a sandwich configuration between two polymeric films. The polymer films must be removed before the sheet molding composition can be molded to its final form. Generally, phenolic sheet molding compositions are oven-aged at 30° to 60° C. for a few days before the sheets can be removed by peeling from the phenolic composition. The oven-aging is a time consuming and expensive process. Accordingly, it is an object of the present invention to provide a phenolic sheet molding composition having improved aging or maturation properties, and requiring a shorter maturation time and little or no oven-aging before removing the polymer film.

SUMMARY OF THE INVENTION

In accordance with the present invention, phenolic molding compositions, particularly useful as sheet molding compounds comprise (1) a resole phenolic resin, (2) a curing agent selected from the group consisting of alkaline earth metal oxides or hydroxides and silanes, (3) a filler, and (4) an epoxy resin. In addition, the composition will also typically contain such adjuvants as a mold release agent, a coupling agent, and the like. The molding compositions may be combined with reinforcing fibers, such as glass fibers or filaments for use in sheet molding compound processes, and the like.

The resole phenolic resins, useful in the practice of the invention are generally prepared by reacting a phenolic with an excess molar proportion of an aldehyde in the presence of an alkaline catalyst. Examples of phenols which can be used in preparing a phenol aldehyde resole for use in practicing the invention include ortho-para-directing hydroxy or amino aromatic compounds having 6 to 24 carbon atoms such as phenol itself ($C_6H_5OH$), naphthol, anthranol and substituted derivatives thereof where the substituents on the aromatic compound are independently selected from hydrogen; halogen such as Cl, Br and F; $NH_2$ and hydrocarbon radicals such as:

a. alkyl groups or radicals of 1 to 12 carbon atoms, preferably of 1 to 9 carbon atoms, and their various isomeric forms and substituted on the aromatic nucleus in the ortho or para position;

b. cycloalkyl groups of 5 to 12 carbon atoms such as cyclohexyl, cyclopentyl, methylcyclohexyl, butylcyclohexyl, and so forth;

c. aryl ketonic groups wherein the hydrocarbon portion is as defined below in e.;

d. alkyl, aryl and cycloalkyl carboxylic groups wherein the hydrocarbon part is defined as above in a. and b.;
e. aryl groups of 6 to 24 carbon atoms such as phenyl, naphthyl, anthryl, and the like;
f. aryl substituted alkyl wherein the aryl is phenyl which may contain lower alkyl and/or hydroxy substituents so that the resulting hydroxy aromatic is, for example, a bisphenol;
g. the oxyhydrocarbon radicals corresponding to the foregoing hydrocarbon radicals; and
h. mixtures of the aforesaid hydroxy aromatics.

Suitable substituted phenols include meta-cresol, m-propyl phenol, m-isobutyl phenol, m-sec-butyl phenol, m-tert-butyl phenol, m-bromo phenol, m-chloro phenol, m-phenyl phenol, m-benzyl phenol, m-cetyl phenol, m-cumyl phenol, m-hydroxyacetophenone, m-hydroxybenzophenone, m-d-limonene phenol The corresponding phenols substituted in the ortho- and para-positions can be used in part but are not preferred.

Mixtures of various hydroxy aromatic compounds mentioned herein also may be used.

Included among the phenolic reactants which may be used are those known as the "cresylic acids" and these often comprise heterogeneous mixtures having two reacting hydrogen positions on each of them; that is, compounds unsubstituted in the ortho- and para-positions, and hence, yield relatively unreactive resins. These compounds may include the following: 3,5-xylenol, m-cresol, 3-4-xylenol, 2,5-xylenol, 2,3-xylenol, phenol, p-cresol, o-cresol, 2,4-xylenol, and 2,6-xylenol. Cresylic acids r tar acids may include phenol and its homologs which may include cresols, xylenols, trimethyl phenols, ethyl phenols, and higher boiling materials such as dihydroxy phenols, polycyclic phenols and the like. They are often obtained by a low-temperature trimerization of coal, lignite, and the like, or a conventional high-temperature coke oven tar, or the liquid product of petroleum cracking both thermo and catalytic, shell oil, coal hydrogenation products, and the like.

Polyhydroxyaromatic reactants, such as resorcinol, may also be used.

Also useful in this invention are mixtures of aniline and phenol to react with an aldehyde or ketone to produce a resole.

Also useful in the invention are mixtures of urea and phenol to react with the aldehyde or ketone to produce a resole.

Among the aldehydes which may be used within the scope of this invention to produce resoles are formaldehydes or any of its variations, such as 37 percent or higher concentrations of formalin, or paraldehyde, acetaldehyde, propionaldehyde, isobutyraldehyde, isopentaldehyde, and the like. The aldehyde should have not more than 8 carbon atoms and should not detrimentally affect the resinification of the resin. Preferred aldehydes are those having from 1 to 4 carbon atoms, such as formaldehyde, which may be in aqueous solution (37 percent or higher), or in any of its low polymeric forms such as paraformaldehyde or trioxane. Other aldehydes include para-aldehydes, furfural, 2-ethylhexanal, ethylbutyraldehyde, heptaldehyde, benzaldehyde and crotonaldehyde.

The alkaline catalyst used in preparing the resoles to be used in this invention may be any of those known in the art; for instance, sodium hydroxide and calcium hydroxide. In general, the alkali metal hydroxides and the alkaline earth metal hydroxides and ammonium hydroxide and the amines such as triethanol amines may be used.

In the preparation of the resole, the ratio of aldehyde to phenol employed is preferably in the range of about 1.1:1 to 2.5:1. Generally, the reaction mixture is gradually heated to reflux and held at elevated temperatures of about 60° C up to the reflux temperature until less than about two percent of free formaldehyde remains. Less than two percent free $CH_2O$ is desirable. The reaction mixture is then cooled and the catalyst can but need not be neutralized with an acid such as glacial acetic or sulfuric acid. The pH is adjusted to roughly 5 to 8. The resin is then drhydrated to about 60 to 80 percent solids.

Following condensation reaction to form a resole, a stoichiometric quantity of an acid such as sulfuric acid, or acetic acid, and the like, can be added to the reaction mixture in order to neutralize the alkaline condensation catalyst. Sulfuric acid is conveniently employed to neutralize a sodium hydroxide catalyst. The final resin should have a pH of about 5 to 7 for better stability.

The curing agents that may be employed in the sheet molding compounds of this invention include alkaline earth metal compounds, especially the oxides and hydroxides of magnesium, calcium, barium and silane compounds, especially the aminoalkyl silanes. Commercially available silanes that may be employed include gamma-aminopropyltriethoxy silane and N-beta (aminoethyl) gamma-aminopropyltrimethoxy silane. The preferred alkaline earth metal compound curing agents are the oxides and hydroxides of magnesium and calcium and most especially, mixtures thereof.

In the preparation of the sheet molding compound, the resinous composition is laid down on a moving sheet of plastic film. Control of the viscosity of the resinous composition at this point is very important to successful sheet molding compound operation. It has been found that the use of calcium oxide or hydroxide causes rapid hardening of the sheet molding compound. The use of magnesium hydroxide or oxide alone results in a slow hardening rate. A mixture of calcium and magnesium oxides or hydroxides provides excellent control of viscosity of the plastic mass, also referred to as a treating mix, on the moving sheet. The preferred mixtures of calcium and magnesium oxides or hydroxides for this purpose are those wherein the weight ratio of calcium hydroxides or oxide to magnesium hydroxide or oxide is between about 10:1 and 0.1:10. The curing agent is typically employed in an amount of 0.1 to about 15 percent by weight based on the total weight of the sheet molding composition.

Fillers are employed in the sheet molding compounds of the invention, typically in amounts of about 5 to about 80 percent by weight of the molding compound. A wide variety of fillers, known in the art, may be employed. The preferred fillers are clay, talc and mixtures thereof. Aluminum trihydrate and various microspheres such as glass, ceramic and organic spheres may also be employed. Auxiliary inorganic or organic fillers are those fillers normally used in phenolic molding compound, and include for example silicates, aluminates, carbides, carbon, carbonates, metals, rock, mineral, sulfates, oxides, mica, wollastonite and the like. Fillers also effect the viscosity of the resinous composition. When talc alone is used as the filler, the viscosity of the plastic mass increases rapidly. When clay alone is used as the filler, the viscosity of the mix increases slowly However, excellent viscosity control may be achieved when a mixture of talc and clay is used.

The epoxy resin, which serves as a chemical thickening agent in the sheet molding compounds of this invention, provides an advantageous decrease in maturation time. As a result, little or no oven-aging is required, and the maturation time, that is, the time required before the outer polymer films may be stripped prior to molding, is decreased. The amount of epoxy resin employed may vary considerably, for example, from about 5 to about 50 weight percent, preferably about 5 to about 40 weight percent, and more preferably from about 8 to about 25 weight percent based on the total weight of the resole phenolic resin and epoxy resin. In terms of total composition, the amount of epoxy resin may vary from about 2 to about 50 percent, preferably from about 5 to about 50 percent, and most preferably from about 10 to about 25 percent by weight based on the total weight of the molding composition.

A wide range of epoxy resins, characterized, for example, by molecular weights as high as 8000 or higher may be employed. Preferably, the epoxy resin will be of a molecular weight in the range of about 300 to about 1000.

Epoxy resins that may be employed include, but are not limited to, those having, on the average, about two or more epoxide groups per molecule. Such resins are well-known and commercially available. Typical of such epoxy resins are those derived from a polyhydric alcohol or polyhydric phenol and an epihalohydrin such as epichlorohydrin or epibromohydrin. Examples of polyhydric alcohols or polyhydric phenols that can be reacted with an epihalohydrin to provide these epoxy resins are resorcinol, hydroquinone, Bisphenol A, p,p'-dihydroxy benzophenone, p,p'-dihydroxy phenol, p,p'-dihydroxy diphenyl ethane, bis-(2-hydroxy naphthyl) methane, 1,5-dihydroxy naphthalene, ethylene glycol, propylene glycol, 1,4-butane diol, hydrogenated Bisphenol A, 1,4-cyclohexane diol, 1,3-cyclopentane diol, cyclohexane dimethanol, and the like. These epoxy resins, as is well-known in the art, are made in the desired molecular weights by reacting the epihalohydrin and the diols in various ratios, or by reacting dihydric phenol with a lower molecular weight polyepoxide resin. Other epoxy resins are glycidyl polyethers of Bisphenol A. Examples of commercially available epoxy resins of the type described above and useful in this invention to form, e.g., composites, include Epon 828, available from and a trademark of Shell Chemical Company (Houston, Texas). Mixtures of the epoxy resins may also be employed.

The mold release agents normally used with phenolic molding compounds are generally employed in the compositions of the invention. Among these are stearic acid and metal salts thereof such as zinc, calcium and magnesium stearates. Organic compounds such as glycerol monostearate can be used.

The molding compounds of this invention may also include a silane coupling agent in an amount of about 0.01 to about 10 percent by weight of the total molding composition to improve the strength properties and the effectiveness of fiber reinforcement. Suitable coupling agents for this purpose are well-known in the art and include, for example, tetraethyloxysilane and various aminoalkylsilanes such as gamma-aminopropyltriethoxysilane, and gamma-aminopropyltrimethoxysilane.

The phenolic resin compositions of the invention are use to produce bulk or sheet molding compounds by blending the resins with inert fibers and/or fillers.

Suitable inert fibers are glass fibers of varying lengths in the range of 1.5 to 50 millimeters. The resins of the invention are particularly suited to use with long glass fibers which are particularly capable of giving high strength products. Long glass fibers generally have a length in the range of about 12 to 50 millimeters. Other inorganic and organic fibers include carbon, graphite, ceramics, polyester, aramid and polyacrylonitrile.

The sheet molding compounds of the invention may be prepared employing the resins, fillers, inorganic or organic fibers and other additives such as just described in the following manner. The resins are mixed with inorganic fillers containing a divalent base to form a treating mix. The treating mix is flowed onto a first sheet which is preferably a thin plastic sheet or film such as polyethylene, polyester, polypropylene, and the like. A layer of chopped fibers is added to the layer on the first sheet. The treating mix has a controlled viscosity such that it flows onto the sheet to form a layer of uniform thickness, and to properly wet the fibers. The treating mix for sheet molding compounds generally has a viscosity in the range of about 8000 to about 30,000 centipoises at 33° C. A second layer of treating mix is placed on top of the layer of fibers and a second plastic sheet is applied to the upper surface. The resulting composite is passed between a series of rollers to form a mechanically handleable sheet molding compound. The resulting compound is rolled up and stored in a warm room at about 20° to 70° C. for 24 to 100 hours or longer and to form a strippable, moldable sheet molding compound. The resulting product is readily moldable at elevated temperatures to produce a variety of products such as structural panels for use in the transportation industry and in the construction industry.

The molding compositions, or treating mixes of this invention are particularly useful in the preparation of sheet molding compounds having improved maturation times. It will be appreciated however, that these molding compositions are also useful in bulk molding processes, pultrusion processes, filament winding, continuous laminating processes, ram injection molding processes, transfer molding processes and the like. Such processes are well-known in the art and are described, for example, in co-pending application, Ser. No. 784,404, now U.S. Pat. No. 4,785,040, the disclosure of which is incorporated herein by reference.

The following examples are provided to further illustrate this invention and the manner in which it may be carried out. It will be understood, however, that the specific details given in the examples have been chosen for purposes of illustration only and are not to be construed as limiting the invention. In the examples, unless otherwise indicated, all parts and percentages are by weight and all temperatures are in degrees Celsius.

EXAMPLE I

A mixture of 66.4 parts of clay (Paragon Clay; J. M. Huber Co.), 2.4 parts of zinc stearate, 2.4 parts of magnesium oxide, and 10.8 parts of hollow glass micron spheres (Q Cel 600; the PQ Corporation), were roll-milled for about one-half hour to form a filler mixture.

A resin mixture was prepared by combining 81 parts of resole (Durez 51010; Occidental Chemical Corporation) 8.5 parts of epoxy resin (EPON 828; Shell Chemical Company; a commercially available epoxy resin which is a diglycidyl ether of bisphenol A), 6.2 parts of silane coupling agent, (Union Carbide A-1102, gamma-aminopropyl triethoxy silane; Union Carbide Corporation) and mixing on a high speed mixer. Mixing was continued while the filler mixture was added to the resin mixture over a period of about 3 to 5 minutes. Immediately following the mixing, the temperature of the resulting treating mix was 47° C and the Brookfield viscosity was 16,000 centipoises.

The treating mix was deposited on a moving film or polyethylene in an SMC machine. Glass fibers were deposited on the moving film. A layer of treating mix was deposited on the glass, followed by a second polyethylene film. The resultant sheet molding composite was passed through a set of squeeze rolls and then rolled and stored at 45° C. for 96 hours.

Portions of the sheet molding composite were then molded at 163° C. to form cured products having the properties set forth in Table I.

TABLE I

| Tensile Strength | $9.3 \times 10^3$ psi |
|---|---|
| Tensile Modulus | $1.61 \times 10^6$ psi |
| Flexural Strength | $18.6 \times 10^3$ psi |
| Flexural Modulus | $1.32 \times 10^6$ psi |
| Notched Izod Impact Strength | 5.3 ft-lb/inch |

EXAMPLE II

A mixture of 66.6 parts of clay (Paragon Clay), 2.4 parts of zinc stearate, 2.4 parts of magnesium oxide and 10.8 parts of hollow glass microspheres (Q Cel 600) were roll-milled for about one-half hour to form a filler mixture.

A resin mixture was prepared by combining 90 parts of resole (Durez 51010) and 4.2 parts of silane coupling agent (Union Carbide A-1102), and mixing on a high speed mixer. Mixing was continued while the filler mixture was added to the resin mixture over a period of about 3 to 5 minutes. Immediately following the mixing, the temperature of the resulting treating mix was 45° C. and the Brookfield viscosity was 16,000 centipoises.

The treating mix was deposited on a film of polyethylene in an SMC machine. Glass fibers were deposited over the layer of treating mix on the moving film. A second layer of treating mix was deposited over the glass fibers, followed by a second polyethylene film. The resultant sheet molding composite was passed through a set of squeeze rolls and then rolled and stored at 45° C. for 96 hours.

Portions of the sheet molding composite were then molded at 163° C. to form cured products having the properties set forth in Table II.

TABLE II

| Tensile Strength | $5.5 \times 10^3$ psi |
|---|---|
| Tensile Modulus | $1.33 \times 10^6$ psi |
| Flexural Strength | $10.7 \times 10^3$ psi |
| Flexural Modulus | $1 \times 10^6$ psi |
| Notched Izod Impact Strength | 4.6 ft-lb/inch |

EXAMPLE III

A mixture of 18 parts of clay (Paragon Clay), 18 parts of talc (Glacier 325; Cyprus International Minerals Co.), 9 parts hollow glass microspheres (Q Cel 600), 2.7 parts ceramic spheres, 2 parts of zinc stearate, 2 parts of magnesium oxide, and 1 part of calcium hydroxide, were roll-milled for about one-half hour to form a filler mixture.

A resin mixture was prepared by combining 70 parts of resole (Durez 51010), 7.5 parts of epoxy resin (EPON 828), 2 parts of silane coupling agent (Union Carbide A-1102), and 3 parts of methanol and mixing on a high speed mixer. Mixing was continued while the filler mixture was added to the resin mixture over a period of about 3 to 5 minutes. Immediately following the mixing, the temperature of the resulting treating mix was 33° C and the Brookfield viscosity was 22,400 centipoises.

The treating mix was deposited on a film of polyethylene in an SMC machine. Glass fibers were deposited on the moving film. A layer of treating mix was deposited on the glass, followed by a second polyethylene film. The resultant sheet molding composite was passed through a set of squeeze rolls and then rolled and stored at 45° C for 96 hours.

Portions of the sheet molding composite were then molded at 163° C. to form cured products having the properties set forth in Table III.

TABLE III

| Tensile Strength | $8.4 \times 10^3$ psi |
|---|---|
| Tensile Modulus | $1.47 \times 10^6$ psi |
| Flexural Strength | $18.7 \times 10^3$ psi |
| Flexural Modulus | $1.24 \times 10^6$ psi |
| Notched Izod Impact Strength | 5.55 ft-lb/inch |

EXAMPLE IV

A) Following the general procedure of the preceding examples, a filler mix was prepared by combining and mixing 36.8 parts of clay, 36.8 parts of talc, 36.8 parts of hollow glass microspheres (Q Cel 600), 5.3 parts zinc stearate, 7.1 parts of magnesium hydroxide, and 7.1 parts of calcium hydroxide.

A resin mixture was prepared by combining and mixing 200 parts of resole (Durez 51010), 8 parts of silane coupling agent (Union Carbide A-1102).

A treating mix was then prepared from 208 parts of the resin mix combined with 130 parts of the filler mix.

The treating mix was spread between two polyethylene sheets and rolled flat.

B) The procedure was repeated except that 40 parts of epoxy resin (EPON 828) was added to the resin mixture, in place of 40 parts of resole. The amount of epoxy resin in composition B) was 20 weight percent based on the weight of the resole phenolic resin and epoxy resin.

C) The procedure was repeated except that 20 parts of epoxy resin (EPON 828) was added to the resin mixture, in place of 20 parts of resole. The amount of epoxy resin in composition C) was 10 weight percent based on the weight of the resole phenolic resin and epoxy resin.

The compositions prepared in IVA), IVB, and IVC) were stored at room temperature and tested periodically to determine whether the polyethylene film could be peeled from the polymer surface. The composition of Example IVB) was readily peelable after less than 3 days; the composition of Example IVC) was readily peelable after 18 days; while the composition of Example IVA) required 26 days before the film could be peeled off.

EXAMPLE V

Blends of the Durez 51010 resole resin and EPON 828 epoxy resin were prepared and held at temperatures of 23° to 25° C. for extended periods. Samples of each blend were tested for viscosity in cps at periodic intervals. The proportions, times, and temperatures and shown in Table IV. The viscosity data show how the viscosities generally increase until the weight ratio of resole to epoxy resin is about 50:50, preferably about 60:40. Thus, the upper limit of epoxy resin is about 50 weight percent based on the total weight of resole phenolic resin and epoxy resin, preferably about 40 weight percent.

ically different than said curing agent; and an epoxy resin, wherein the epoxy resin is present in a proportion of about 5 to about 25 weight percent of epoxy resin based on the total weight of the resole phenolic resin and epoxy resin.

2. A sheet molding compound according to claim 1 wherein the filler comprises clay, talc, a mixture of clay and talc, microspheres, or a mixture of clay, talc and microspheres.

TABLE IV

| Example | Resole Eposy Proportions | | 1 Day 25° C. | 2 days 23° C. | 5 days 24° C. | 6 days 25° C. | 8 days 23° C. | 12 days 23° C. | 19 days 23° C. | 23 days 24° C. | 30 days 24° C. |
|---|---|---|---|---|---|---|---|---|---|---|---|
| A | 100 | 0 | 8,000 | 9,280 | 9,920 | 11,520 | 12,480 | 16,000 | 19,200 | 19,840 | 26,200 |
| B | 95 | 5 | 8,640 | 12,800 | 18,240 | 21,280 | 25,920 | 34,200 | 39,040 | 44,160 | 56,000 |
| C | 90 | 10 | 10,560 | 17,920 | 40,960 | 62,400 | 83,200 | 148,800 | 240,000 | 195,200 | 246,000 |
| D | 85 | 15 | 11,200 | 18,240 | 56,000 | 97,600 | 161,600 | 448,000 | 1,062,400 | 678,400 | 819,000 |
| E | 80 | 20 | 11,200 | 23,360 | 83,200 | 140,800 | 268,800 | 665,600 | 1,504,000 | 1,344,000 | 2,016,000 |
| F | 70 | 30 | 10,880 | 24,000 | 112,000 | 198,100 | 499,200 | 1,792,000 | * | — | — |
| G | 60 | 40 | 10,560 | 18,560 | 72,000 | 153,600 | 416,000 | 2,016,000 | * | — | — |
| H | 50 | 50 | 9,600 | 15,360 | 57,600 | 91,200 | 224,000 | 1,280,000 | * | — | — |
| I | 40 | 60 | 8,000 | 12,480 | 23,040 | 33,280 | 33,280 | 90,400 | 320,000 | 793,600 | — |
| J | 20 | 80 | 8,000 | 12,800 | 8,000 | 9,920 | 10,240 | 11,200 | 12,480 | 11,680 | 11,840 |
| K | 0 | 100 | 14,560 | 18,560 | 19,200 | 21,100 | 22,400 | 21,120 | 20,800 | 18,240 | 17,920 |

*gelled

What is claimed is:

1. A sheet molding compound comprising a fiber reinforced treating mix sandwiched between polymeric films, said treating mix comprising, in percent by weight, based on the total composition, about 20 to about 60 percent resole phenolic resin; about 0.1 to about 15 percent of a curing agent selected from the group consisting of alkaline earth metal oxides and hydroxides, about 5 to about 60 percent filler that is chem- 3. A sheet molding compound according to claim 1 wherein the epoxy resin is a diglycidyl ether of bisphenol A.

4. A sheet molding compound of claim 1 wherein the epoxy resin is present in the treating mix in a proportion of about 8 to about 25 weight percent epoxy resin, based on the total weight of resole phenolic resin and epoxy resin.

* * * * *